(12) United States Patent
Joyce et al.

(10) Patent No.: US 6,362,485 B1
(45) Date of Patent: Mar. 26, 2002

(54) NEUTRON RADIATION DETECTOR

(75) Inventors: Malcolm John Joyce; Brian Robert More, both of Preston; David Thomas Bartlett, Didcot; Richard John Tanner, Didcot; David Glyndwr Jones, Didcot, all of (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/308,900

(22) PCT Filed: Dec. 2, 1997

(86) PCT No.: PCT/GB97/03214

§ 371 Date: Jul. 15, 1999

§ 102(e) Date: Jul. 15, 1999

(87) PCT Pub. No.: WO98/25160

PCT Pub. Date: Jun. 11, 1998

(30) Foreign Application Priority Data

Dec. 4, 1996 (GB) .............................................. 9625209

(51) Int. Cl.⁷ ................................................ G01T 3/00
(52) U.S. Cl. ............................ 250/390.01; 250/390.03; 250/370.05
(58) Field of Search .................. 250/390.01, 370.05, 250/370.07, 390.03, 390.11, 391

(56) References Cited

U.S. PATENT DOCUMENTS

| | | | |
|---|---|---|---|
| 3,792,280 A | * | 2/1974 | Piltingsrud .............. 250/390.03 |
| 4,288,291 A | * | 9/1981 | Cisco et al. ................. 376/153 |
| 4,383,179 A | | 5/1983 | Elsen et al. |
| 4,588,898 A | | 5/1986 | Piesch et al. |
| 4,893,017 A | | 1/1990 | Kronenberg |
| 5,278,417 A | | 1/1994 | Sun |
| 5,321,269 A | | 6/1994 | Kitaguchi et al. |
| 5,578,830 A | | 11/1996 | Olsher et al. |
| 5,828,069 A | * | 10/1998 | Umiastowski et al. . 250/390.01 |

FOREIGN PATENT DOCUMENTS

| | | | |
|---|---|---|---|
| GB | 1446625 | 8/1976 | |
| GB | 2124014 | 2/1984 | |
| WO | WO-96/12974 A1 * | 5/1996 | ............. G01T/3/00 |

OTHER PUBLICATIONS

Lindquist et al., "Radiation–Induced Changes in the Physical Properties of Boraflex, a Neutron Absorber Material for Nuclear Applications", Aug. 4, 1994, Journal of Nuclear Materials, pp. 223–228.

Basson et al., "Measurement of the energy response of a $B^{10}$ Shielded $U^{235}$ Fission Chamber", 1962, Nuclear Instruments and Methods, pp. 321–325.

Harvey et al., "A Neutron Survey Instrument which Gives Information on the Low energy Neutron Spectrum and Can Be Used for Albedo Dosemeter Calibration",1988; Radiation Protection Dosimetry, vol. 23, No. ¼, pp. 277–280.

Boot et al., "A Counter for Measuring Neutron Dose Equivalent from Thermal Energies to 10 keV", Dec. 1978, Environment & Medical Science Division, A.E.R.E., Harwell.

* cited by examiner

Primary Examiner—Constantine Hannaher
Assistant Examiner—Albert Gagliardi
(74) Attorney, Agent, or Firm—Beyer Weaver & Thomas LLP

(57) ABSTRACT

A neutron monitoring instrument, principally of the survey type, is provided with an inner neutron detector(s) enclosed in a layer of neutron attenuating material and one or more outer neutron detectors provided on the attenuating layer and enclosed in a layer of neutron moderating material. The inner detector(s) monitor neutrons in the 100 KeV to 15 MeV energy range, with the outer detectors monitoring neutrons in the thermal to 100 KeV range. Sensitivity across the spectrum and evenness of response are improved compared with the prior art to give better close equivalence determinations.

25 Claims, 7 Drawing Sheets

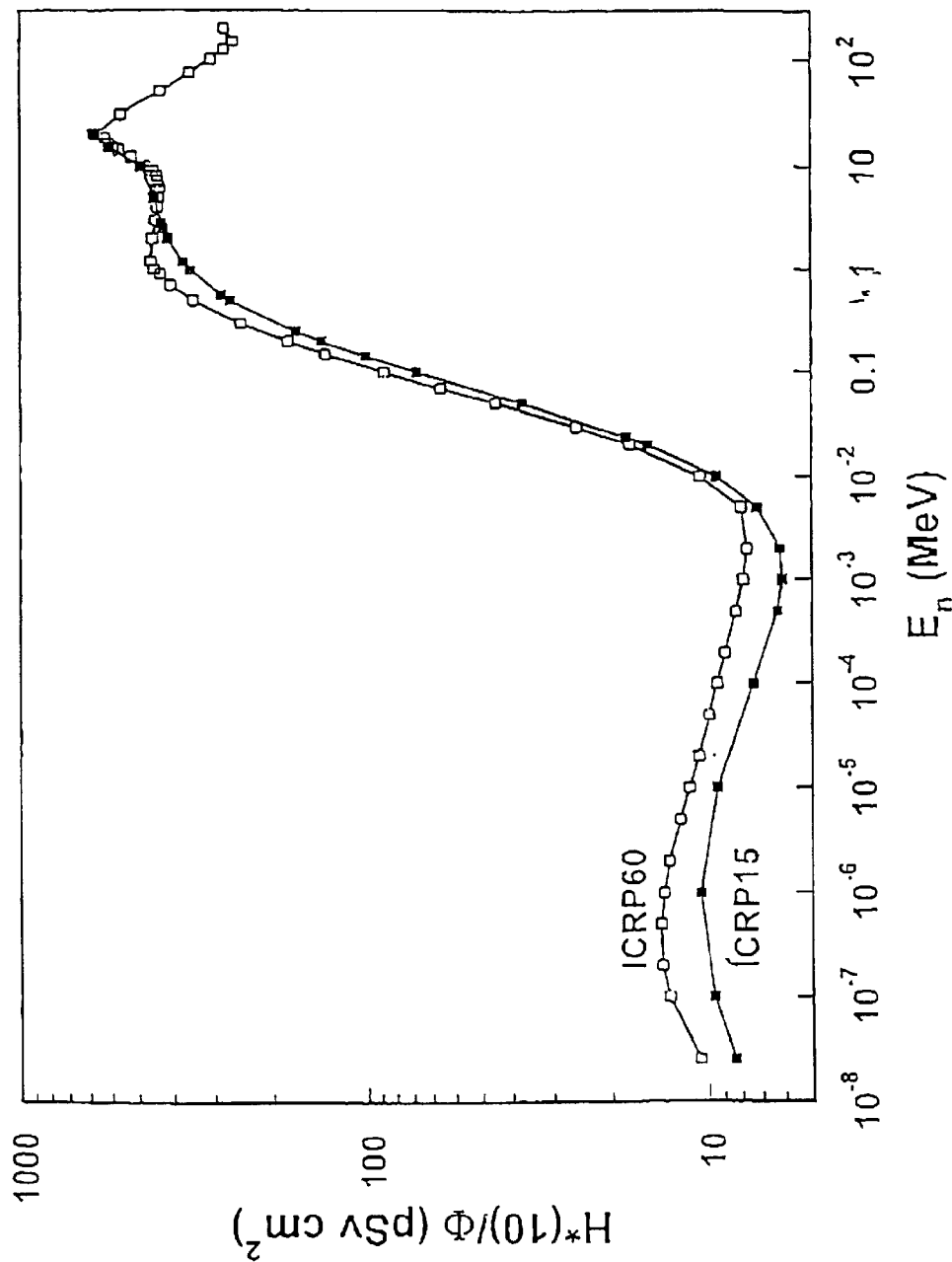
Fig 1: Fluence to Ambient Dose Equivalent Conversion Coefficients for the new and old Q(L) and S/ρ

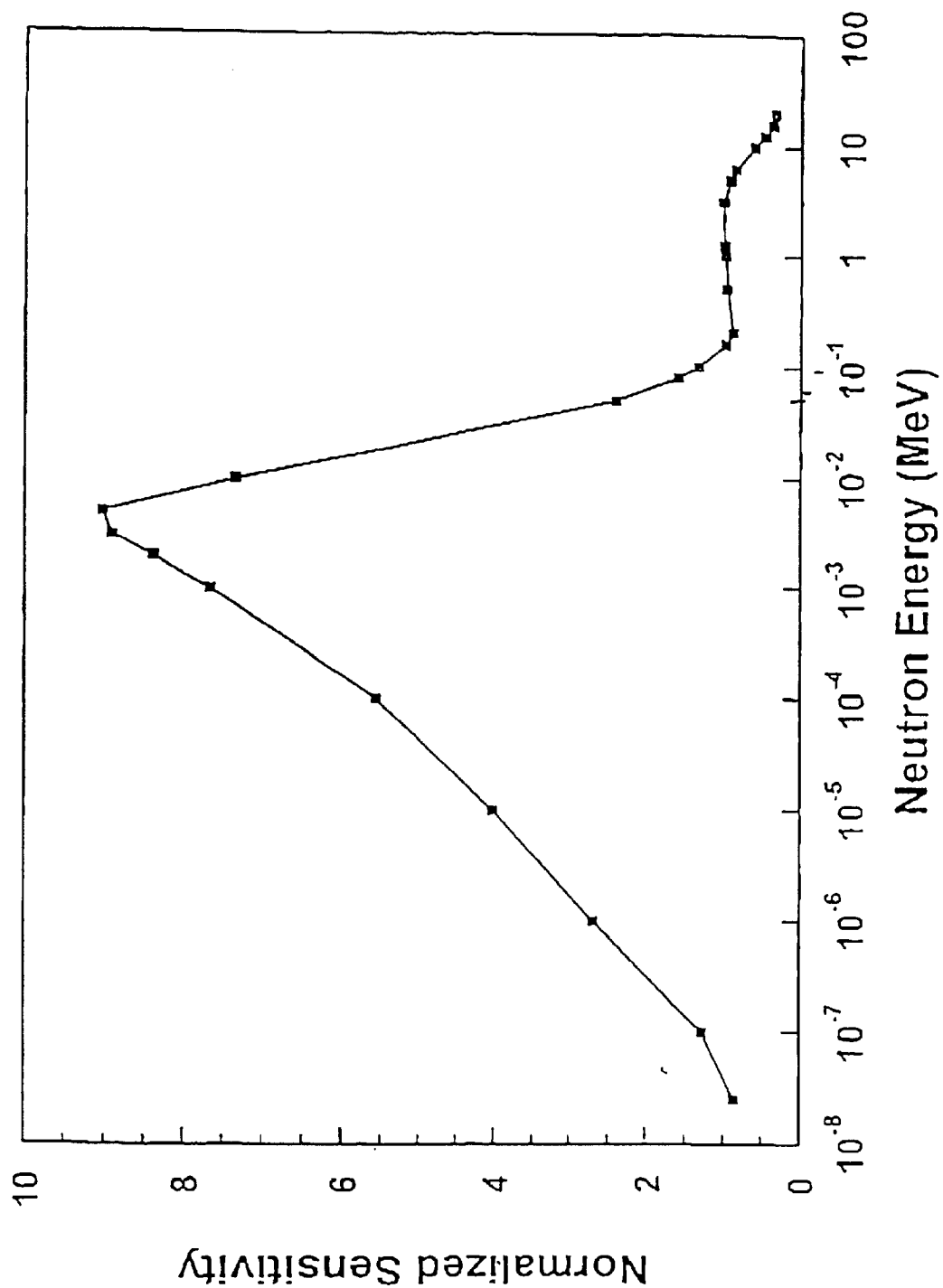
Fig 2: H*(10) sensitivity of a prior art device

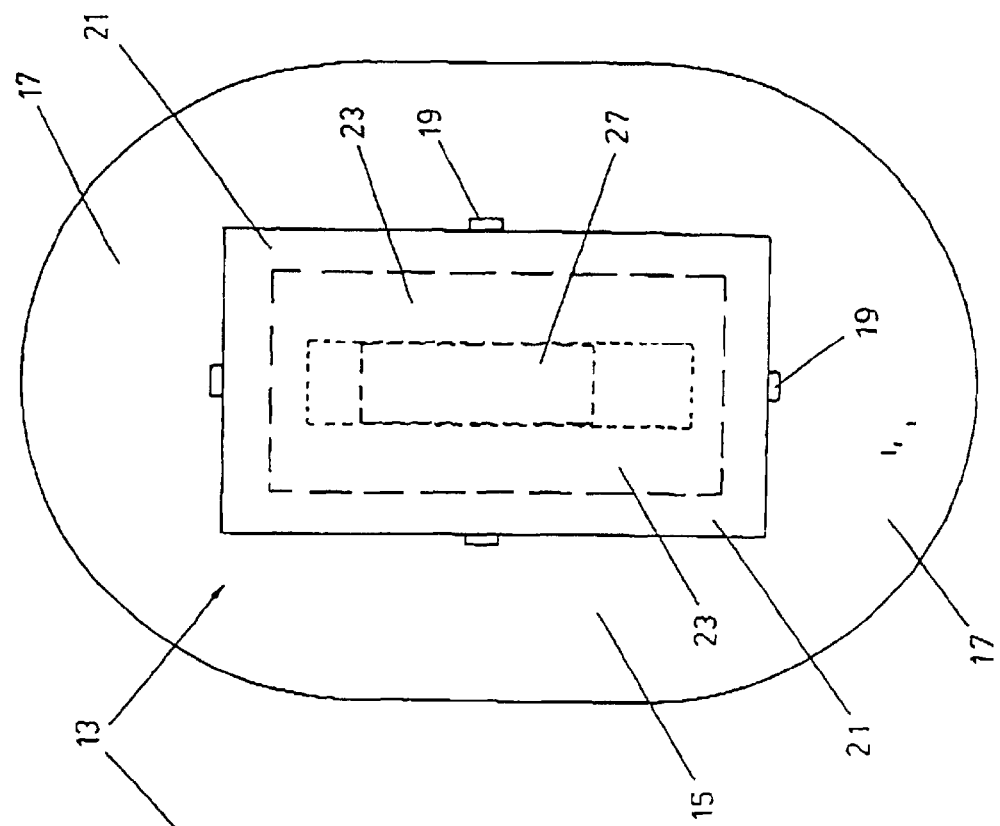
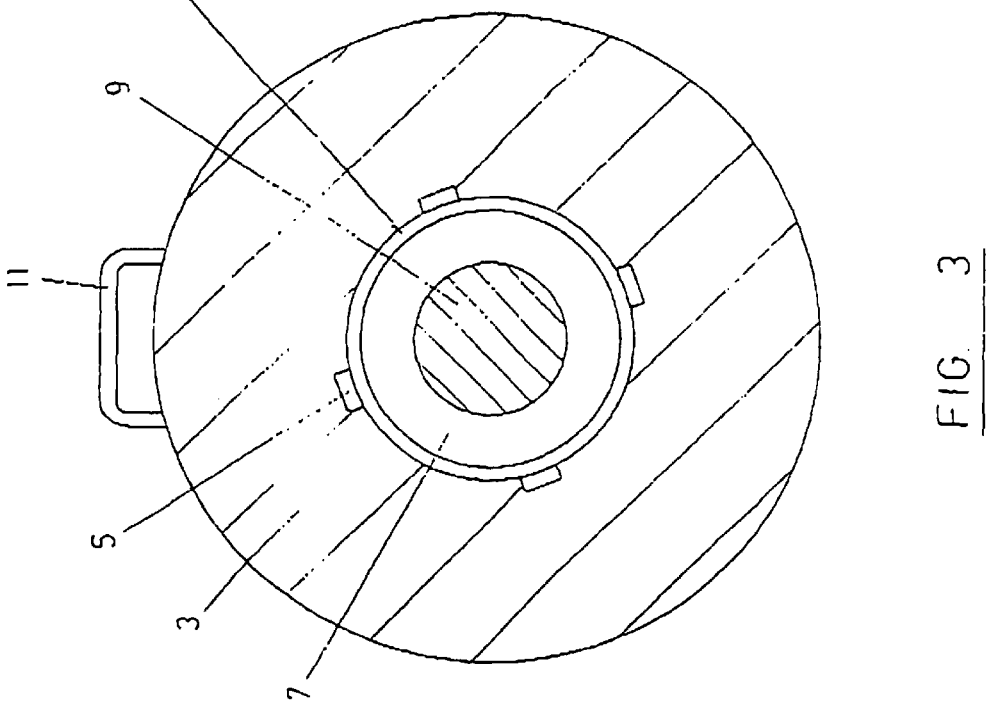

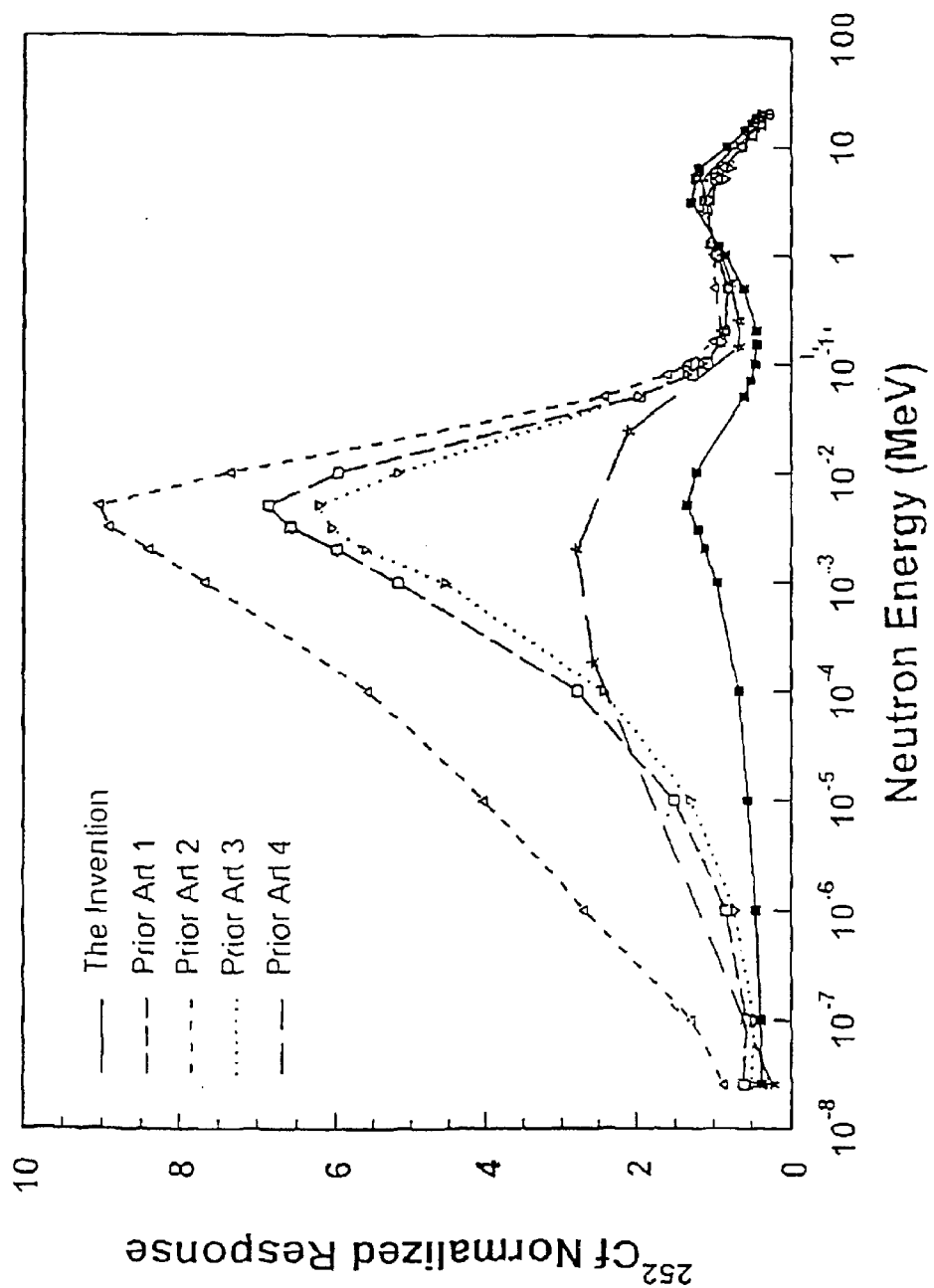
Fig 5: H*(10) sensitivity of the invention compared to prior art instruments

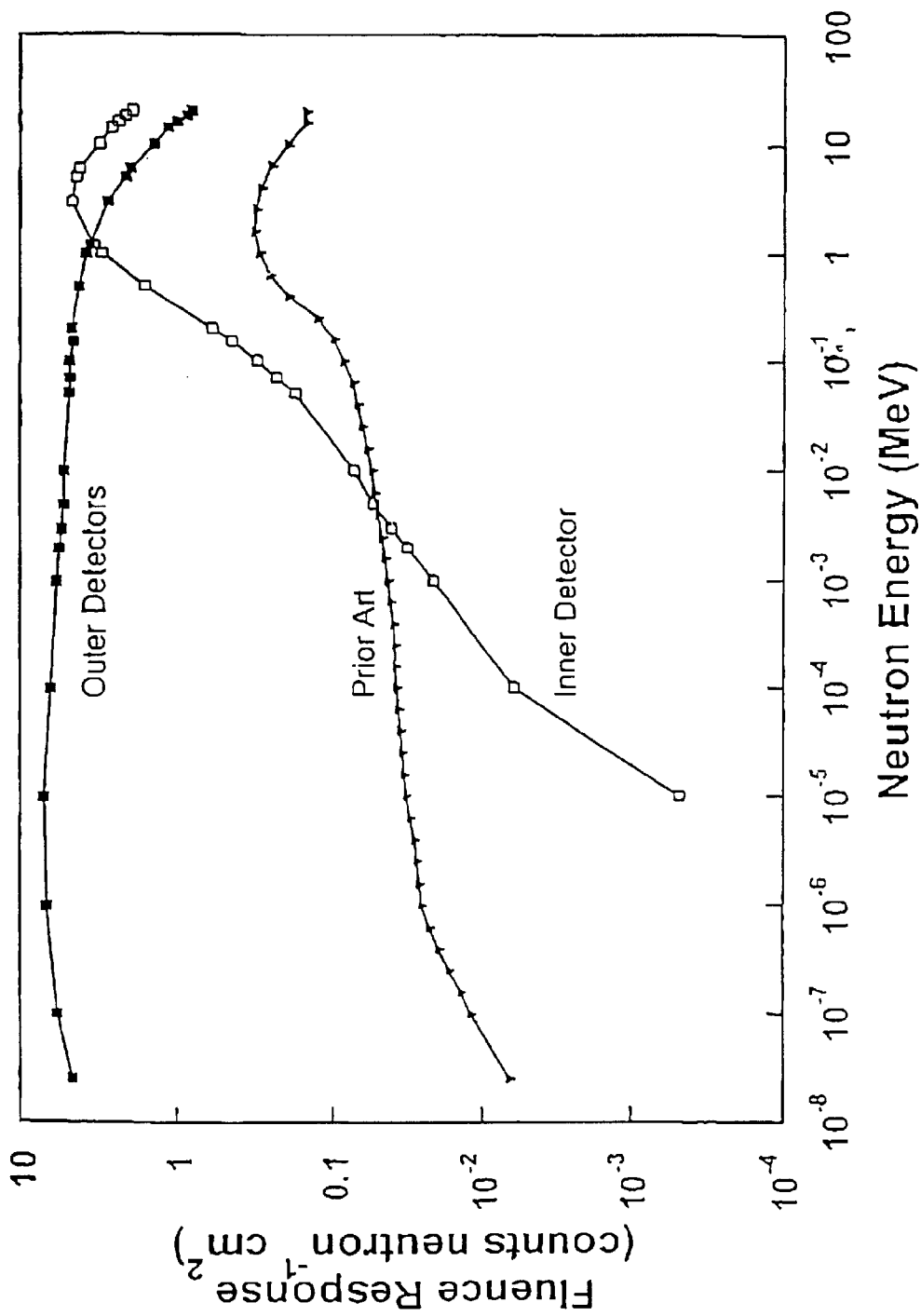
Fig 6: Detection rate against fluence rate for the inner and outer detectors according to the invention and for a prior art device

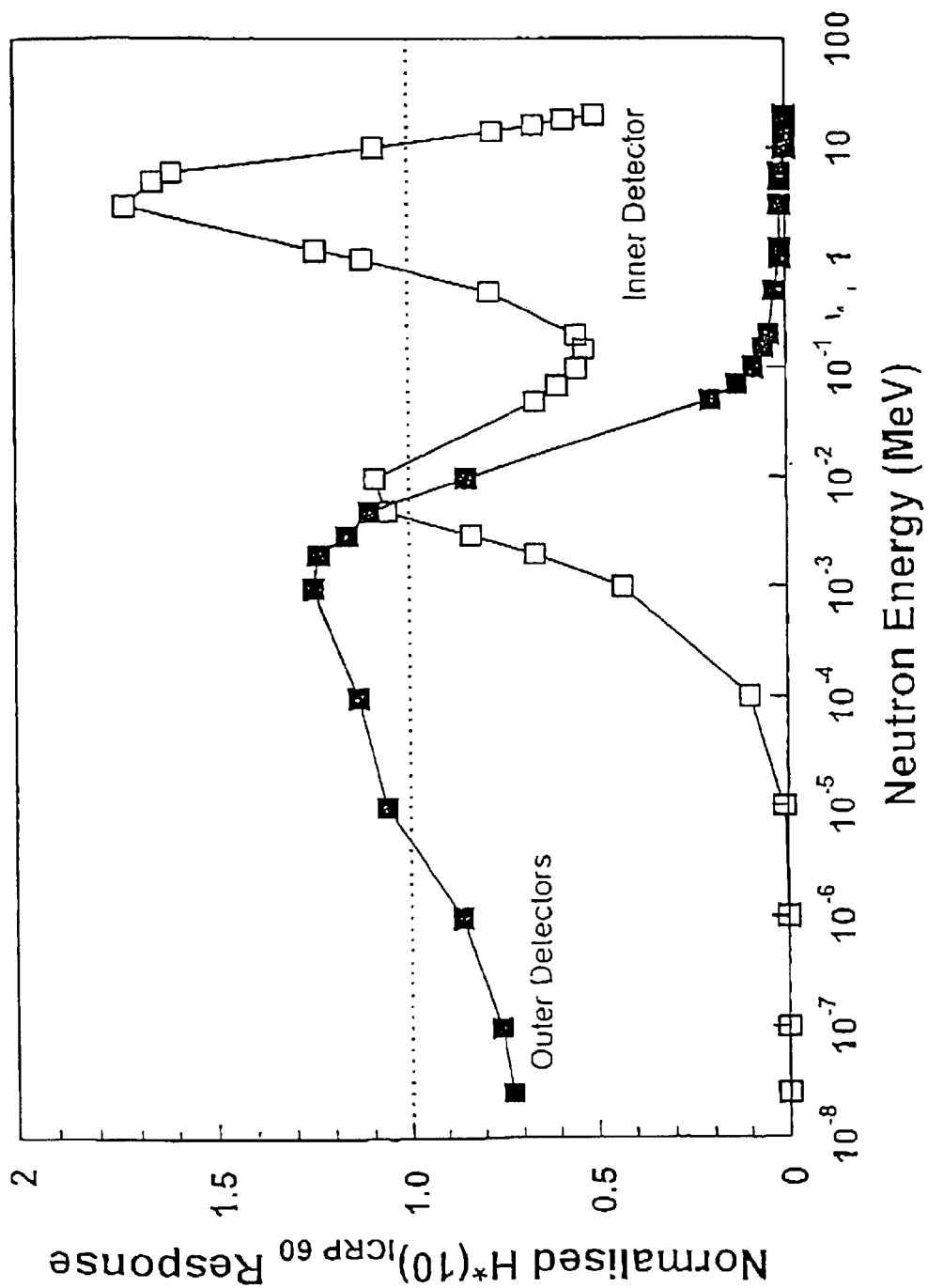
Fig 7: Detection rate against H*(10) for the inner and outer detectors according to the invention

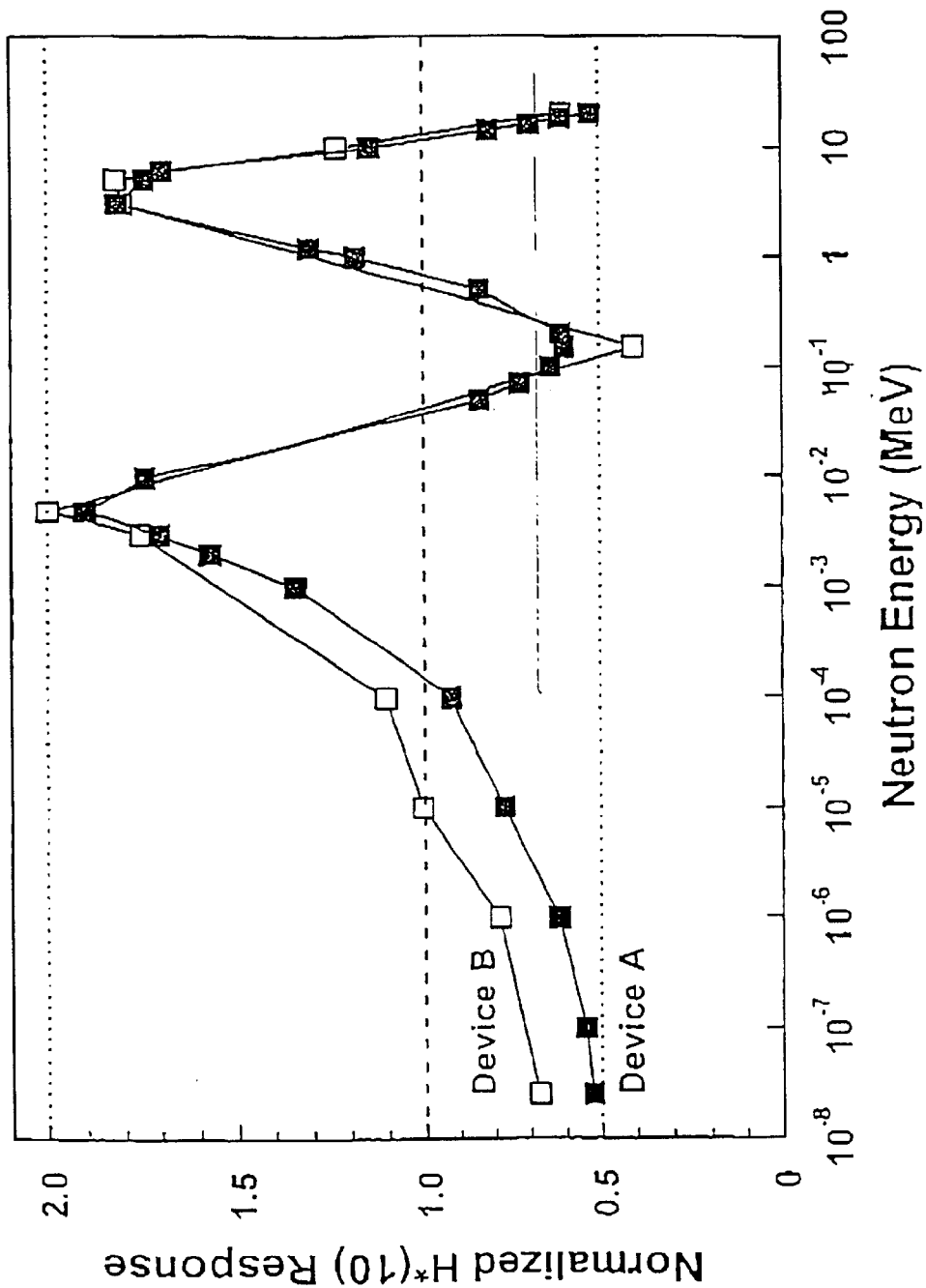
Fig 8: Normalized H*(10) Response Characteristic for both Device A and Device B

NEUTRON RADIATION DETECTOR

This invention is concerned with improvements in and relating to instruments and methods of measuring, particularly, but not exclusively with regard to neutron radiation.

Accurate measurement of neutron dosimetry is important in ensuring that environments intended for operations involving personnel access are accurately surveyed and/or that personnel operating in environments where significant radiation exists receive a dose suitably below the limit permitted.

In most cases the dose is made up of neutrons of different energies forming a spectrum. The spread of this spectrum and the proportions of the dose in each part are significant because of the differing level of biological hazard they present.

In general in existing instruments the neutrons are detected and the results presented as a total dose equivalent. The relative hazard of different energies varies, however, and so a weighting is applied to the results or the instrument is designed to obtain an approximate weighting by physical means, in obtaining this equivalence. A typical indication of the weighting given to the different energy levels is indicated in FIG. 1. Prior art devices face a number of problems including the following.

Firstly many prior art instruments are limited in terms of the range of neutron energies they can monitor. Problems particularly occur at the high energy range. Such instruments are typified by a polyethylene sphere with a central detector. The volume of polyethylene necessary to attenuate high energy neutrons is prohibitive in terms of weight and size. Such devices, therefore, detect neutrons in part of the energy range with low efficiency.

Secondly the sensitivity of prior art instruments unfortunately varies across the energy range of interest. Thus an instrument may pick up a value of counts/nSv a factor of 6–10 different (peak to trough) at different neutron energies across the range. Such a sensitivity profile is illustrated in FIG. 2 for a prior art device. Thus if the device is calibrated at high energy levels the reading in the presence of a lower energy source can be quite erroneous. This can lead to access problems being identified for areas which are not actually subjected to high radiological dose or to unduly low values being determined. The use of supplemental spectroscopic measurements to establish the spectrum of neutrons detected and so apply an absolute correction factor is time consuming, expensive and impracticable.

These inaccuracies, and others, have been tolerated in the past as to an extent it was thought the worst deviations occurred in parts of the neutron energy range which were not of the greatest importance or where little dose was received. In recent times however it has been realised that the neutron risk factor is greater than previously accepted (a weighting of 20 for instance, rather than 10 relative to gamma photons is now applied at some energies) As a result increased sensitivity with less deviation throughout a wide energy range is sought.

Additionally as a third problem, the weighting factors applied to different parts of the spectra are periodically updated. The nature of many prior art instruments means that such changes would require wide scale reconfiguration in the device, even necessitating hardware replacement in some cases or acceptance of larger deviations. A more versatile instrument is thus also desirable.

The device should desirably be readily portable in terms of size and weight. Hand held applications are common and the operator is frequently called upon to hold the device at arms length to avoid interactions caused by the operator's body.

According to a first aspect of the invention we provide an instrument for detecting radiation, the instrument comprising an inner neutron detector and an outer neutron detector, the inner and outer detectors being separated by an inner layer of neutron attenuating material, an outer layer of neutron moderating material being provided around the outer detector.

The instrument is preferably a survey instrument. The instrument is preferably used away from the operator. A separation of at least 50 cm, more preferably at least 1 m and ideally far greater may be employed.

Attenuation and/or moderation for the neutrons detecting is preferably only provided by the instrument, for instance when considered relative to ambient ions in the environment.

Preferably the inner layer of neutron attenuating material substantially or completely surrounds the inner detector. Preferably the inside of the inner layer conforms to the outside of the inner detector.

Preferably the outer layer of neutron moderating material substantially or completely surrounds the inner layer and/or outer neutron detector. Preferably the inside of the outer layer conforms to the outside of the inner layer and/or outer neutron detector.

The outer neutron detectors may be provided in or on a continuous or substantially continuous neutron detector carrier layer. The neutron detector carrier layer may be sandwiched between the inner and outer layers.

Preferably the inner layer is spherical. Preferably the inner surface of the inner layer is defined by a radius of between 1 and 8 cm, more preferably 2 to 5 cm. Preferably the outer surface of the inner layer is defined by a radius of between 3 and 13 cm, most preferably 4 to 8 cm.

Preferably the outer layer is spherical. Preferably the inner surface of the outer layer is defined by a radius of between 3 and 13.5 cm. The outer detector carrier layer maybe between 0.05 and 0.5 cm. Preferably the outer surface of the outer layer is defined by a radius of between 7 and 25 cm.

The inner detector may be cylindrical of cross sectional radius between 2 and 5 cm and of length between 5 and 15 cm.

The inner layer may be defined as a hollow cylinder with or without hollow hemispherical ends.

The inner surface of the cylindrical portion may be defined by a radius of between 1 and 5 cm. The outer surface of the cylindrical portion maybe defined by a radius of between 4 and 7.5 cm. The hemispherical end's inner surface maybe defined by a radius of between 1 and 5 cm. The hemispherical end's outer surface may be defined by a radius of between 4 and 7.5 cm.

The inner surface of the inner layer may be defined by a right cylinder of total length between 5 and 15 cm and/or of a radius between 1 and 5 cm. The outer surface of the inner layer may be defined by a right cylinder of between 10 and 25 cm in length and/or of radius between 4 and 7.5 cm.

The outer layer may be defined as a hollow cylinder with or without hollow hemispherical ends.

The inner surface of the cylindrical portion may be defined by a radius of between and 4 and 8 cm. The outer surface of the cylindrical portion may be defined by a radius of between 8 and 16 cm. The hemispherical end's inner surface maybe defined by a radius of between 4 and 8 cm. The hemispherical end's outer surface maybe defined by a radius of between 8 and 16 cm.

Alternatively the hemispherical end's inner surface may be defined by a right cylinder of radius between 4 and 7.5 cm and/or with a length into the hemisphere of between 4 and 9 cm.

Preferably the inner layer comprises a plurality of layers. The layers may be of different materials and/or be of different properties. Preferably the inner layer comprises a first and second layer. Preferably the inner surface of the second layer conforms to the outer surface of the first layer. The first and second inner layers may be spherical or present as a hollow cylinder with or without hemispherical ends or as a right cylinder. The second layer may be thicker than the first and outside the first. The inner layer may be of composite form. The layers may both be of substantially constant thickness throughout. The thickness of the two layers may be the same or different to one another.

Preferably the outer layer is formed from a hydrogen containing material. Preferably the material is a plastic, such as polythene. The use of high density polythene is particularly preferred, for instance having a density of between 0.85 and 95 g/cm3.

The material maybe between 3 and 8 cm thick. The material may have a constant thickness, plus or minus 0.2 cm.

Preferably the outer layer is shaped to provide a substantially even thickness of material around the outer detectors. The outer layer may be spherical or cylindrical with hemispherical ends.

The outer layer may be provided with a carrying handle and/or externally mounted processing means. The processing means may alternatively be positioned away from the device. The processing means are preferably in communication with the device. Hard wiring, optical, radio or other means maybe used.

Preferably the thickness of material around the inner detector is substantially constant throughout, plus or minus 0.2 cm.

The inner layer, or one layer of it, may be formed from boron The boron may be natural or enriched in the boron 10 isotope, or in powder form or in a matrix. A plastics matrix maybe used to provide the boron.

The inner layer, or one layer of it, may be formed from a hydrogen containing material. The material may be a plastic, such as polythene.

Preferably the inner layer includes a boron containing layer and a plastics containing layer. It is particularly preferred that the plastics layer be provided innermost. Preferably the boron layer ranges between 1 and 5 cm in thickness. Preferably the plastics layer ranges between 0.5 and 3 cm in thickness.

The inner detector may be spherical or cylindrical. A sphere of between 1 and 8 cm, more preferably 1 and 5 cm, radius may be provided. The cylinder may be between 5 and 15 cm long. The cylinder maybe between 1 and 5 cm in radius.

The detector may be of the $^3$He type, with or without $CH_4$, or of the $BF_3$ type or comprise a scintillator with separate or incorporated $^6$Li converter and photo multiplier tube. A 3.5 atm $^3$He, 1 atm. or $BF_3$ detector is a further option.

The signals from the inner and outer detectors are preferably conveyed separately to the processing means.

Preferably the instrument is capable of detecting neutrons in the energy range 1 eV to 20 MeV. Preferably the instrument is capable of detecting neutrons in the energy range thermal to 15 MeV. Preferably the outer detector is capable of detecting neutrons in the range thermal to 100 keV. Preferably the inner detector is capable of detecting neutrons in the energy range 100 keV to 15 MeV.

Preferably the outer detectors are solid state detectors. A $^6$Li converter in contact with a solid state electronic detector is particularly preferred.

Preferably a plurality of outer detectors are provided. Between 4 and 16 outer detectors may be used, with between 6 and 8 being particularly preferred. The detectors maybe provided in tetrahedral, orthogonal or octagonal distribution, most preferably offset from the vertical. Preferably the detectors are provided in an even distribution, without providing a detector under a handle or other potentially interfering part of the device.

The detectors may be sandwiched directly between the inner and outer layers or placed at a depth within the outer layer. Alternatively the detectors may be provided in a discrete layer of their own. The layer may be between 0.02 and 0.5 cm in thickness.

Preferably the instrument can detect neutrons in a substantially non-directionally sensitive manner.

Sensitivity in at least a 300° arc and more preferably a 360° arc, on an horizontal plane, about the vertical axis of the instrument, is preferably substantially equivalent throughout.

Sensitivity in at least a 70° arc, more preferably an 80° arc and ideally a 90° arc extending from an horizontal plane for the instrument towards the vertical axis, upward or downward, is preferably substantially equivalent throughout. Preferably the equivalent sensitivity from the horizontal plane towards the vertical axis extends for at least a 300° arc and more preferably a 360° arc about the vertical axis of the instrument. The sensitivity in an arc downward from the horizontal plane may be the same, less or greater than for an arc upward from the horizontal plane.

Substantially equivalent sensitivity may be within + or −10% of the sensitivity of the average sensitivity of the instrument throughout that arc and/or 3-dimensional zone defined by the arc definitions. The sensitivity may be an overall average sensitivity for the energy spectrum measured and/or the sensitivity to one or more neutron energies, for instance, $10^{-5}$ MeV, $10^{-4}$ MeV, $10^{-3}$ MeV, $10^{-2}$ MeV, $10^{-1}$ MeV, 1 MeV or 10 MeV.

The inner and outer detector signals are preferably processed separately. The processing means may provide a read out of dose equivalent rate and/or total dose equivalent and/or time of reading and/or spectral hardness. Preferably the readout is based on at least 100 counts.

According to a second aspect of the invention we provide a method of detecting radiation using a device according to the first aspect of the invention.

Various embodiments of the invention will now be described with reference to the drawings in which:

FIG. 1 shows fluence to dose equivalent conversion coefficients for different energy neutrons under old and updated coefficients;

FIG. 2 displays the relative neutron dose equivalent sensitivity for a prior art instrument;

FIG. 3 illustrates a first embodiment of an instrument according to the invention;

FIG. 4 illustrates a second embodiment of an instrument according to the invention;

FIG. 5 illustrates the relative dose equivalent sensitivity for an instrument according to the invention in comparison with prior art instruments;

FIG. 6 illustrates the detection rate against actual neutron fluence rate with energy for the inner and outer detectors of an instrument according to the invention;

FIG. 7 shows the dose equivalent response characteristics of inner and outer detectors against energy for the device of Example A; and FIG. 8 shows the combined detector dose equivalent response characteristic against energy for the devices of both Example A and Example B.

Dose equivalent is used in comparing environments with safety standards. The dose equivalent provides a unitary value for comparison irrespective of the spectrum of neutrons actually making up the dose.

FIG. 1 clearly illustrates that in determining dose equivalent neutrons of different energies are seen as having varying significance. Thus progressively greater significance is applied to neutrons of energy greater than $3 \times 10^3$ eV. The conversion coefficients from neutron fluence to dose equivalent are revised periodically. ICRP60 (open space) represents newer conversion coefficients than ICRP15 (closed space).

As illustrated in FIG. 2 the relative dose equivalent sensitivity of prior art instruments also varies across the neutron energy range under consideration, which frequently ranges from 1 eV up to 20 MeV. The vertical axis, expressing the normalised (to $^{252}$Cf) counts detected/nSv clearly shows that the sensitivity in the 1 eV to 50 KeV range is significantly greater and above a few $10^6$ eV the sensitivity is significantly lower for instance for this instrument.

The count rate for the neutrons detected is used in prior art systems to give dose equivalent by applying a normalisation factor appropriate for the neutron fields (spectra) to be measured. The use of specific modifying factors based on knowledge of the actual neutron workplace spectrum is not a viable option on each use. Variations, however, occur and so assumptions may need to allow for the worst case scenario. Substantial differences between the actual and predicted equivalent dose may arise as a result of assumptions made.

As illustrated schematically in FIG. 3 the instrument of one embodiment of the present invention is made up from an outer hollow moderating sphere 3 around a neutron detector array 5. Within this the instrument has a further hollow sphere 13 which acts to differentially attenuate the neutrons, and a further hollow sphere 7 to further moderate the neutrons. The sphere 7 contains a further neutron detector 9.

The sphere 3 acts as a moderator for incoming neutrons so as to reduce at least a part of the energy range to an energy where they can be more efficiently detected. The sphere 3 is formed from high density polyethylene in a thickness of 10 cm. The sphere aims to present as much hydrogen as possible to the path of the neutrons in as small a volume as reasonably possible. High purity, high density, high molecular weight polyethylene of a suitable type, (density 0.92 g/cm3; 14.28% hydrogen) is suitable for this purpose.

The solid state neutron detectors 5 are provided by $^6$Li converter (n($\alpha$,T)) in intimate contact with a silicon photodiode. $^7$LiF detectors may be similarly be used to reduce photon interfering effects by a subtraction method.

Within the detector the neutrons below a certain incident energy are converted to an alpha particle and triton pair. One of these then interacts with the silicon photodiode causing detection giving rise to a signal from the detectors 5.

Signals arising form the detectors 5 pass to the control/ monitoring electronics discussed in more detail below. This signal is indicative of the neutrons initially in the range thermal to 100 keV. Neutrons in this energy range are modified to efficiently detectable energies due to the degree of moderation provided by the outer layer 3.

In the embodiment shown the device is provided with six orthogonal spaced detectors or pairs of detectors 5 The detectors are offset from a vertical arrangement so that none of the detectors 5 are shielded undesirably by the carrying handle 11 provided externally, or by the electronics (not shown).

The sphere 13, thickness 1.5 cm, aims to greatly attenuate all thermal and epithermal neutrons, and differentially attenuate higher energy neutrons passing inward beyond the sphere 3 and detectors 5 after which they can be detected by the inner detector 9. Lower energy neutrons which were capable of being detected by the outer detector 5 are attenuated to such a degree by the sphere 13 that they do not reach the inner detector 9. Due to its high attenuating capability boron is used for this sphere 13.

The boron can be provided in a powder form or contained within a matrix. The level of boron used is suitably such as to be equivalent to a thickness of 1.5 cm when provided at a density of 2500 kg/m$^3$ (areal density 3.75 g/cm$^2$).

The sphere 7, thickness 7 cm, aim to further moderate neutrons emerging inwards from sphere 13, in order to improve the efficiency of detection by the inner detector 9.

The inner detector 9 is provided as a 2 cm radius sphere filled with $^3$He gas at a pressure of 3.5 atmospheres and CH$_4$ of 1 atmosphere or with an equivalent detector medium, such as BF$_3$ or $^3$He in combination with Kr, or with a $^6$Li scintillator and photo multiplier tube. Neutrons incident upon the detector produce alpha particles or protons and tritons which cause ionisation. Pulses are detected and give rise to a signal which passes from the detector 9 to the electronics.

The inner detector 9 thus provides a signal indicative of the neutrons with initial energy levels in the range 100 keV to 15 MeV. The detectors 5 and detector 9 in combination thus give detection across the full energy range.

The second embodiment of the detector set out in FIG. 4 provides an external layer 13 comprising a cylindrical portion 15 with hemispherical ends 17. Once again this layer 13 is provided as a CH$_2$ based polymeric material such as polyethylene.

The outer layer 13 serves to moderate incoming neutrons with a view to reducing the lower energy neutrons to energies at which they can be more efficiently detected by the solid state detectors 19 provided within this layer 13.

The outer layer 13 is followed by a cylindrical layer of "flex boron" 21 which again gives neutron attenuation. Flex boron is a silicon based elastomer containing a high weight percentage of boron. The material is readily machined and typically comprises $2.7 \times 10^{22}$ hydrogen atoms/cc; $2.32 \times 10^{22}$ boron atoms/cc with a density of 1.64 g/cc. Other boron loaded materials, for instance 30% boron polyethylene may be used instead; $6.1 \times 10^{22}$ hydrogen atoms/cc; $2 \times 10^{22}$ boron atoms/cc; density 1.9 g/cc.

Within the flex boron 21 a further polyethylene layer 23 is provided in cylindrical form. The type of polyethylene referred to above may be employed. This additional polyethylene layer is used to increase still further the sensitivity of the instrument. The detector sensitivity normally varies across the energy range it can detect. Neutrons nearer the maximum energy detectable are generally less efficiently detected than those of lower energies. The further polyethylene layer can be used to provide additional moderation and improve the detection efficiency.

A cylindrical hollow within the polyethylene 23 accommodates a smaller length cylindrical inner detector 27. In this case a BF$_3$ detector is employed, the BF$_3$ being provided 90% enriched. The detector is 11 cm long and 3 cm in diameter.

The signals from both inner 5;21 and outer detectors 9;25 are conveyed to a monitoring processing unit, in either embodiment. The signals are recorded for a representative time period, for instance a minimum of 100 counts.

The dose equivalent is then calculated by using software to manipulate the signals from the detectors and associated circuitry. The dose equivalent will depend upon the number of neutrons monitored by the "low" and "high" energy detectors and the relative weighting factor applied. This relative weighting is software controlled so that it can be varied as required. This contrasts sharply with prior art devices in which the weighting was fixed by the instrument design and construction.

The signals obtained can also be used to provide information on the proportions of dose equivalent in different energy regions, the "hardness", by comparing the detection rates of the inner and outer detectors. These relative values may be compared with the assumed "hardness" values to identify any large scale differences from expectations.

As is clear from FIG. 5 the performance of the present invention (solid line) is superior to that of the typical prior art devices (dotted lines). The variation in relative dose equivalent sensitivity is far lower than previously obtained over the entire range and particularly in the key areas previously identified. As a result variations in the workplace field neutron spectra are rendered less significant as the detection rate is less energy (spectrum) dependent.

FIG. 6 illustrates the improvement in the level of detection possible with the invention by comparing the number of actual detection events over time for both detectors with the actual neutron fluence rate as a function of neutron energy for the present invention (solid line) and is compared with a typical prior art device (dotted line). The detection efficiency is seen to be also improved allowing successful monitoring of lower dose equivalent rates.

Experiments were conducted on an example according to the invention, Example A, having a 2 cm radius inner detector material (mass 0.037 g); 1 mm of iron for detector container (mass 41 g); 1 cm of polythene (mass 107 g); 3 cm natural boron (mass 1900 g); outer detector, 1 mm boron layer (mass 109 g); and outer 5 cm of polythene (mass 6100 g) give an overall assembly of 8300 g.

Further experimental investigations were performed on an embodiment of the invention, Example B, having inner detector material (mass 0.037 g); detector container, 1 mm iron, (mass 41 g); 1 cm polythene (mass 107 g); 1.5 cm natural boron (651 g); outer detector layer, boron (mass 62 g); 5 cm polythene (4200 g) to give total mass 5100 g.

FIG. 7 provides an indication of the normalised dose equivalent response characteristics of the inner and outer detectors against the initial energy of the neutrons for Example A. As clearly shown the outer detectors respond to lower energy neutrons with the inner detector only responding to neutrons which have a high enough initial energy to penetrate after moderation and differential attenuation.

FIG. 8 illustrates the combined response for the inner and outer detectors of the Example A and B devices provided above.

The smaller device, B, sacrifices detection rates for the high energy neutrons as fewer are absorbed due to reduced size and reduced moderation. In addition the response across the energy range is not so flat. However, these are made in exchange for the weight saving.

What is claimed is:

1. An instrument for detecting radiation, the instrument comprising an inner neutron detector and an outer neutron detector, the inner and outer detectors being separated by an inner layer of neutron attenuating material, an outer layer of neutron moderating being provided around the outer detector and wherein the inner layer is spherical having an inner surface defined by a radius of between 2 to 5 cm, the outer surface of the inner layer being defined by a radius of between 4 to 8 cm.

2. An instrument according to claim 1 in which said inner layer is spherical and the outer layer is spherical, the inner surface of the outer layer being defined by a radius of between 3 and 13.5 cm and the outer surface of the outer layer being defined by a radius of between 7 and 25 cm.

3. An instrument according to claim 1 in which said inner layer is a hollow cylinder with or without hollow hemispherical ends, the outer layer is defined as a hollow cylinder with or without hollow hemispherical ends, the inner surface of the cylindrical portion being defined by a radius of between 4 and 8 cm, the outer surface of the cylindrical portion being defined by a radius of between 8 and 16 cm.

4. An instrument according to claim 1 in which the inner layer comprises a plurality of layers, two or more of the layers being different materials and/or of different properties.

5. An instrument according to claim 1 in which the inner layer includes a boron containing layer and a plastics containing layer.

6. An instrument according to claim 1 in which the outer layer is formed from a hydrogen containing material, such as polyethylene.

7. An instrument according to claim 1 in which the detector is of the $^3$He, with or without $CH_3$, or of the $BF_3$ type or comprise a $^6$Li and $^7$Li converter pair, scintillators and photo multiplier tubes.

8. An instrument according to claim 1 in which a plurality of outer detectors are provided, in tetrahedral, orthogonal or octagonal distribution and offset from the vertical.

9. A method of detecting radiation using an instrument according to claim 1 comprising the steps of;
   a) detecting radiation by means of the inner and outer neutron detectors;
   b) applying a relative weighting factor to signals monitored by each of the neutron detectors, the relative weighting factor being defined by software; and
   c) calculating a dose equivalent based upon the relative weighting factor.

10. An instrument for detecting radiation, the instrument comprising an inner neutron detector and an outer neutron detector, the inner and outer detectors being separated by an inner layer of neutron attenuating material, an outer layer of neutron moderating material being provided around the outer detector and wherein the inner layer is defined as a hollow cylinder with or without hollow hemispherical ends, the inner surface of the cylindrical portion being defined by a radius of between 1 and 5 cm, the outer surface of the cylindrical portion being defined by a radius of between 4 and 7.5 cm.

11. An instrument according to claim 10 in which said inner layer is spherical and the outer layer is spherical, the inner surface of the outer layer being defined by a radius of between 3 and 13.5 cm and the outer surface of the outer layer being defined by a radius of between 7 and 25 cm.

12. An instrument according to claim 10 in which said inner layer is a hollow cylinder with or without hollow hemispherical ends, the outer layer is defined as a hollow cylinder with or without hollow hemispherical ends, the inner surface of the cylindrical portion being defined by a radius of between 4 and 8 cm, the outer surface of the cylindrical portion being defined by a radius of between 8 and 16 cm.

13. An instrument according to claim 10 in which the inner layer comprises a plurality of layers, two or more of the layers being different materials and/or of different properties.

14. An instrument according to claim 10 in which the inner layer includes a boron containing layer and a plastics containing layer.

15. An instrument according to claim 10 in which the outer layer is formed from a hydrogen containing material, such as polyethylene.

16. An instrument according to claim 10 in which the detector is of the $^3$He, with or without $CH_3$, or of the $BF_3$ type or comprise a $^6$Li and $^7$Li converter pair, scintillators and photo multiplier tubes.

17. An instrument according to claim 10 in which a plurality of outer detectors are provided, in tetrahedral, orthogonal or octagonal distribution and offset from the vertical.

18. An instrument for detecting radiation, the instrument comprising an inner neutron detector and an outer neutron detector in which a dose equivalent can be calculated by applying a relative weighting factor to signals monitored by each of the neutron detectors.

19. An instrument for detecting radiation according to claim 18 wherein the relative weighting factor can be varied under software control.

20. An instrument for detecting radiation, the instrument comprising an inner neutron detector and an outer neutron detector, the inner and outer detectors being separated by an inner layer of neutron attenuating material, an outer layer of neutron moderating material being provided around the outer detector, in which a dose equivalent can be calculated by applying a relative weighting factor to signals monitored by each of the neutron detectors.

21. An instrument according to claim 20 in which the inner neutron detector and outer neutron detector are adapted to detect radiation in different energy regions.

22. An instrument according to claim 20 in which the inner and outer detector signals can be processed separately.

23. An instrument according to claim 20 in which the proportions of dose equivalent in the different energy regions can be calculated.

24. An instrument according to claim 20 in which the signals are recorded over a representative time period.

25. An instrument for detecting radiation according to claim 20 wherein the relative weighting factor is varied under software control.

* * * * *